United States Patent [19]
Christensen et al.

[11] Patent Number: 5,152,489
[45] Date of Patent: Oct. 6, 1992

[54] REMOVABLE ACCESSORY TRAY FOR GOLF BAG CART AND METHOD THEREFORE

[75] Inventors: Bill L. Christensen, Arvada; David K. Diffee, Denver, both of Colo.

[73] Assignee: C & D Enterprises, Wheat Ridge, Colo.

[21] Appl. No.: 728,741

[22] Filed: Jul. 12, 1991

[51] Int. Cl.[5] .............................................. B60R 9/00
[52] U.S. Cl. .................. 248/311.2; 248/230; 224/274; 211/70.2
[58] Field of Search ............... 248/311.2, 313, 185, 248/230, 231, 96; 211/70.2, 81; 224/274

[56] References Cited

U.S. PATENT DOCUMENTS

| | | | |
|---|---|---|---|
| 3,128,021 | 4/1964 | Habbena | 224/274 |
| 3,269,683 | 8/1966 | Shinaver | 248/311.2 X |
| 3,850,398 | 11/1974 | Kantor | 248/230 X |
| 3,938,869 | 2/1976 | Josey | 211/70.2 X |
| 4,596,370 | 6/1986 | Adkins | 248/311.2 |
| 4,784,305 | 11/1988 | Schoenberg | 224/274 |
| 4,889,267 | 12/1989 | Bolton | 224/274 |

Primary Examiner—David M. Purol
Attorney, Agent, or Firm—Dorr, Carson, Sloan & Peterson

[57] ABSTRACT

An accessory tray assembly for a golf bag cart. The assembly includes a tray having two apertures formed therein with pivotally mounted container holders. A golf ball holder is included having two upstanding, resilient walls spaced apart the distance of a golf ball. Tapered ridges are formed along the inner surface of each wall to hold the golf balls therein. Golf balls are inserted in the holder by pushing the balls by the ridges which cause the walls to resiliently move apart to allow golf balls inserted or removed.

End stops are included at the end of the walls to prevent the balls from rolling off the tray and having holes for holding golf tees. Snaps are formed around the perimeter of the tray for attaching straps to hold towels or other items.

A female portion of a bayonet mount is formed on the lower surface of the tray. A clamp having the mating portion of the bayonet mount is attached to the golf bag cart by a rubber bushing. The tray is inserted over the clamp bayonet mount and swiveled to secure the tray onto the clamp and swiveled in the reverse direction to remove the tray.

25 Claims, 4 Drawing Sheets

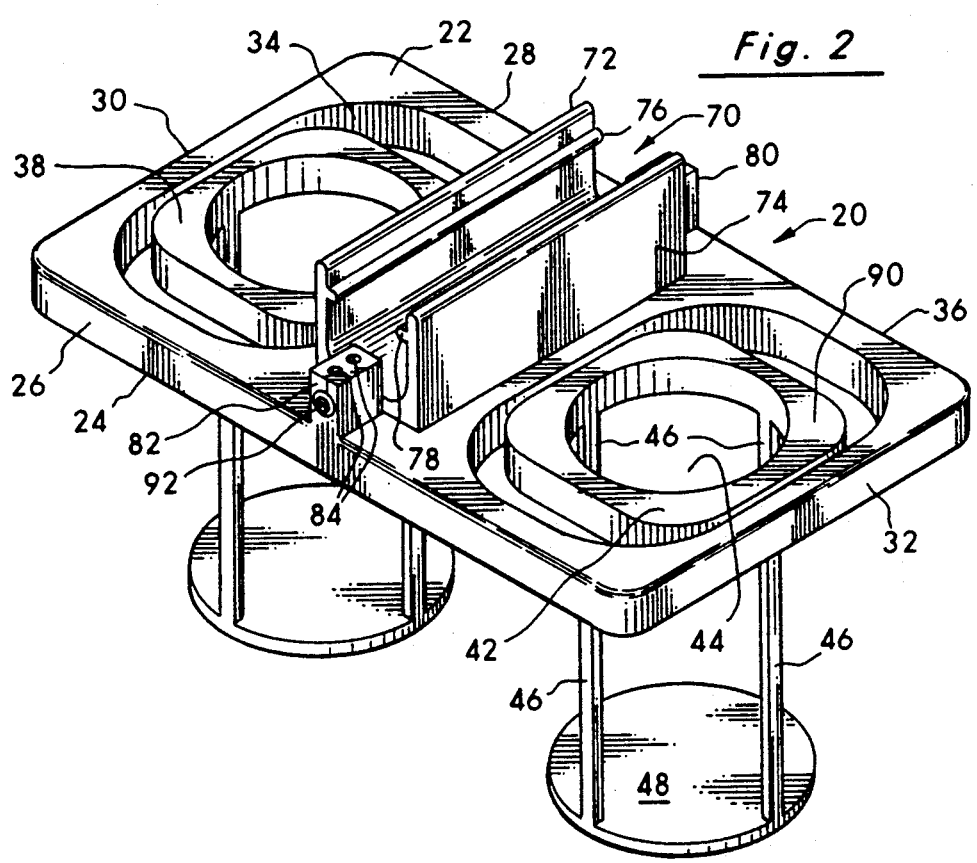
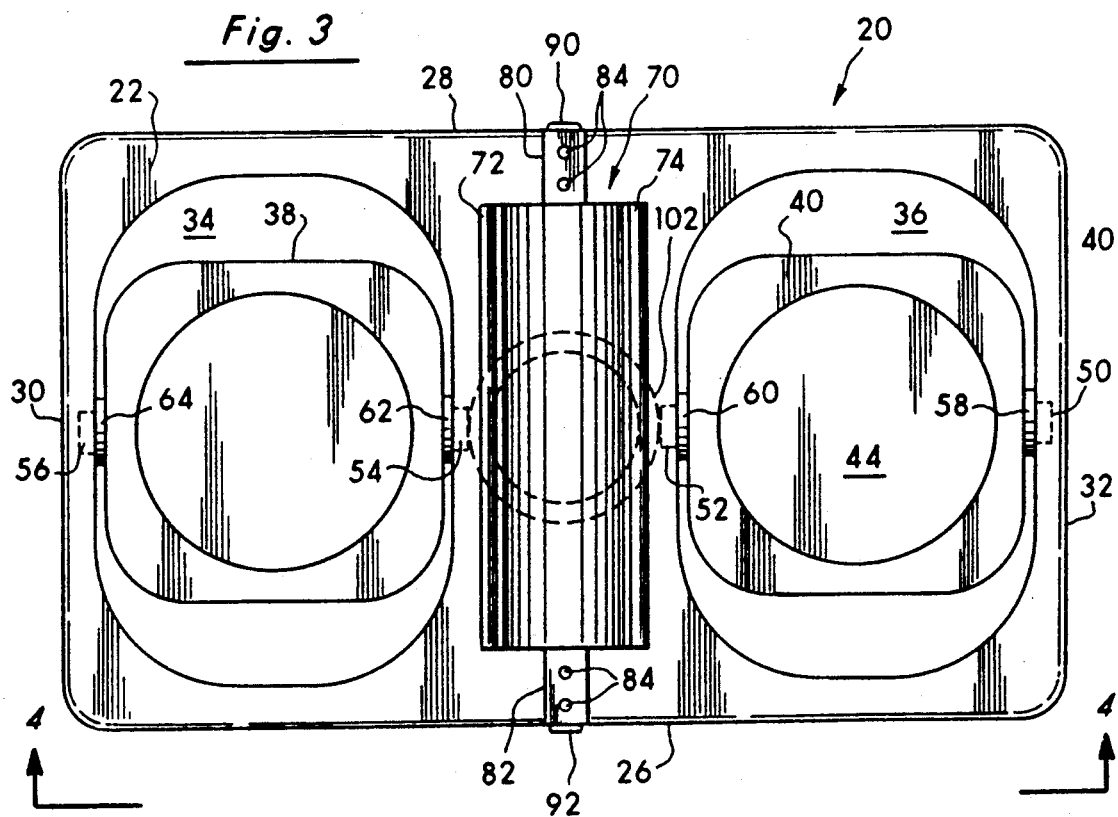

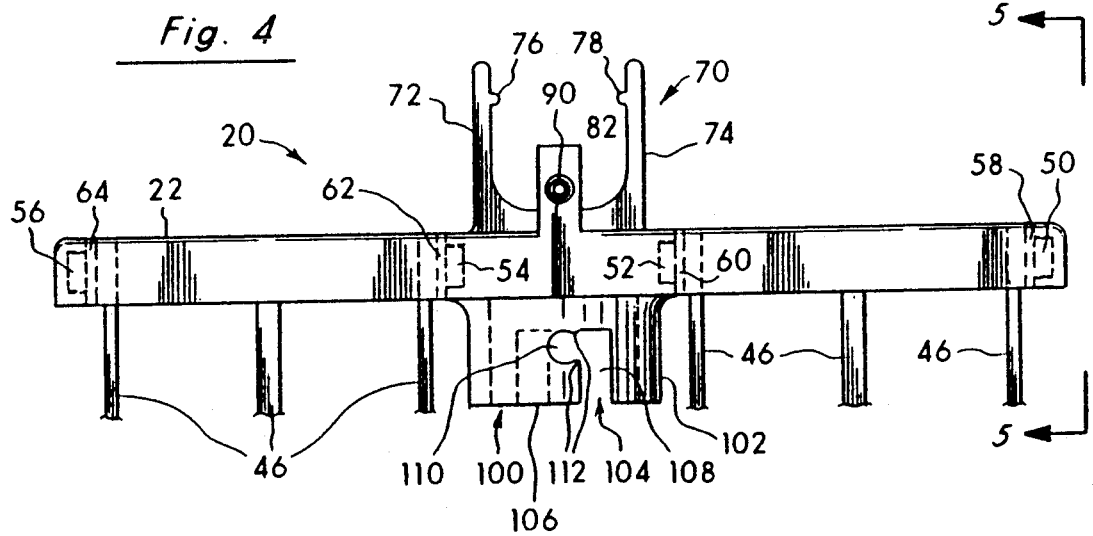
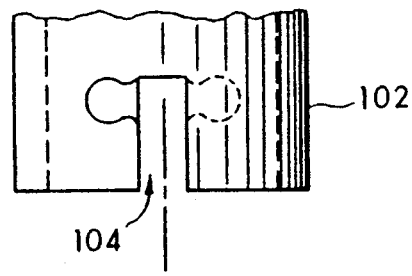
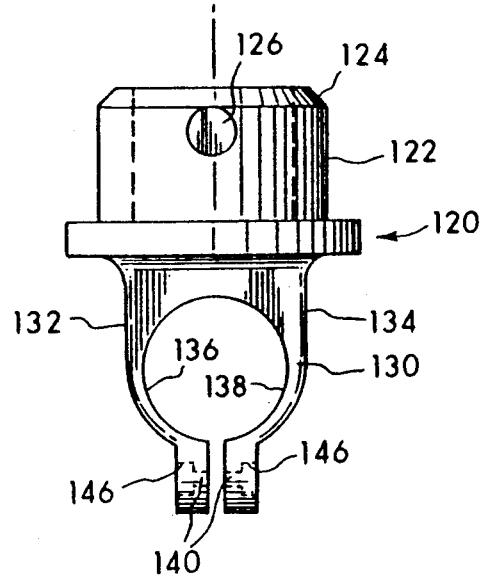
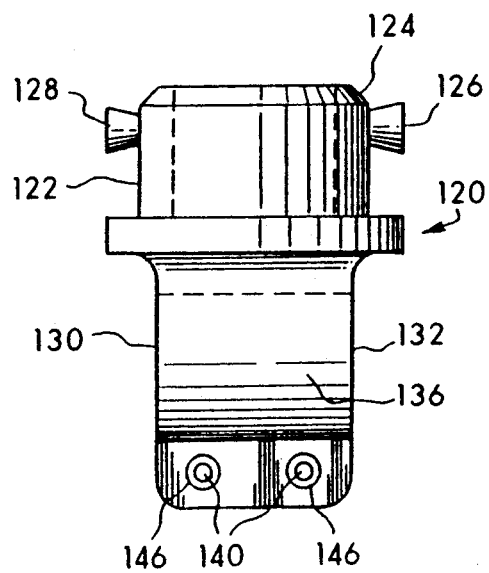

REMOVABLE ACCESSORY TRAY FOR GOLF BAG CART AND METHOD THEREFORE

BACKGROUND OF THE INVENTION

1. Field of the Invention

This invention relates to the field of accessory trays for golf bag carts.

2. Background of the Invention

Golfing enthusiasts often use a golf bag cart to carry their golf bags around the golf course. It is often inconvenient to carry golf tees and golf balls in pockets or in the golf bag itself. Typically, this requires rummaging around in the bag or pockets to find these items as needed. Also, many golfers imbibe liquid refreshments during their traipse around the golf course. There have been several attempts in the past to provide an attachment to the golf bag cart to carry beverages and/or such items as golf balls and golf tees.

One such device is disclosed in U.S. Pat. No. 2,782,971, issued to Hershey. This reference discloses a caddy bag cart tray having a clamping block formed on the lower portion of the tray which clamps directly onto an upper portion of the cart. This tray includes a dimple to hold a single golf ball, a score card holder, pencil holder, golf tee holder, and other holders to hold such items as cigarettes or cigars. This device must be clamped or unclamped by removing screws every time it is used or else left in place when stored. Also, there is no provision for holding beverage containers.

U.S. Pat. No. Des. 176,627, issued to Nash, shows a tray, apparently mounted onto a golf cart by a two clamps. This device has two somewhat circular cutout portions, two rectangular cutout portions and a series of small circular cutout portions. This device apparently must be clamped on every time it is to be used.

U.S. Pat. No. Des. 195,472, issued to Zimmers, shows a tray attachment for a golf cart which is also clamped onto a golf cart whenever it is used. This tray includes a series of holes and a lower portion having a function which is not clear.

U.S. Pat. No. 3,131,842, issued to Dingle, Jr. et al discloses a carrier attachment for golf bag carts. This attachment clamps onto a golf bag cart and must be unclamped whenever it is used. The attachment includes two insulated carriers for beverages, with an upper and lower clamping mechanism.

U.S. Pat. No. 3,734,439 issued to Wintz, discloses a beverage container receptacle and clamp. This receptacle uses a mount which is selectively angled and then clamped in place. The receptacle is then clipped into place onto the mount. The receptacle is able to pivot about an axis parallel to the golf bag cart.

U.S. Pat. No. 4,844,399 issued to Harm, discloses a golf bag cart beverage holder. This holder uses a central clamp which is mounted onto the golf bag cart. Two beverage holders are mounted onto either two pivot rods extending through the clamp or on a single pivot rod extending through the clamp. The holders are able to pivot about an axis perpendicular to the golf bag cart. The clamp must be removed whenever the holders are not needed.

U.S. Pat. No. 2,428,954 issued to Apblett et al discloses a golf equipment holder and carrier. This device is an elaborate storage compartment integrally formed on the cart itself.

U.S. Pat. No. 4,819,843, issued to Nakayama discloses a drink container holder. This holder uses a gimbal-mounted holder on a mounting base for use in an automobile, boat and the like.

All of these devices are clamped directly onto the golf bag cart and require unclamping of the mount to remove, such as for transporting the cart in the trunk of a car or for storing the cart. Further, none of the prior devices are able to provide all of the desired features, such as beverage holders which maintain the beverage in a horizontal plane, hold golf balls securely regardless of the angle of the tray, hold towels, hats or the like and other features. Therefore, there exists a need for an accessory attachment for a golf bag cart having these features.

3. Solution to the Problem

These and other problems are solved by the present invention. The present invention provides an accessory tray for a golf bag cart which will hold beverages, golf balls, golf tees and other items.

The present invention provides an accessory tray assembly which allows quick and easy assembly of the tray onto the golf bag cart.

The present invention provides a lightweight and durable assembly which is relatively inexpensive.

The present invention provides an accessory tray having self-leveling beverage holders.

The present invention provides an accessory tray which can be provided in various colors and logos.

These and other features of the present invention are evident from the ensuing description in conjunction with the drawings.

SUMMARY OF THE INVENTION

The present invention provides an accessory tray assembly for a golf bag cart. The assembly includes a tray having two apertures formed therein. Container holders are pivotally mounted within the apertures to be self-leveling regardless of the angle of the cart or the angle of the tray on the cart. Insulating materials, such as neoprene, can be provided on the container holders to maintain the temperature of the containers.

A golf ball holder is formed on the center area of the tray by two upstanding, resilient walls spaced apart the distance of a golf ball. Tapered ridges are formed along the inner surface of each wall spaced from the lower end of each wall the diameter of a golf ball. Golf balls are inserted in the holder by pushing the balls by the ridges which cause the walls to resiliently move apart. The walls spring back once the balls are inserted. The balls are removed in a similar fashion.

End stops are included at the end of the walls to prevent the balls from rolling off the tray. Holes are formed in the end stops to hold golf tees. The taper of the tees will provide a friction fit to hold the tees until needed.

Snaps are formed around the perimeter of the tray. Straps can be attached to the snaps to hold towels or other items.

A female portion of a bayonet mount is formed on the lower surface of the tray. A clamp having the mating portion of the bayonet mount is attached to the golf bag cart by a rubber bushing. The tray is inserted over the clamp bayonet mount and swiveled to secure the tray onto the clamp. The assembly is designed so that the clamp remains on the cart while the tray is easily removable by swiveling the tray in the reverse direction and removed from the clamp and the cart. This allows the cart to be collapsed for transport and/or storage.

The features of the claimed invention will be understood from the following detailed description of a preferred embodiment taken in conjunction with the drawings.

BRIEF DESCRIPTION OF THE DRAWINGS

FIG. 2 is a perspective view of the accessory tray of the embodiment of FIG. 1.

FIG. 3 is a top view of FIG. 2.

FIG. 4 is a side view along lines 4—4 of FIG. 3.

FIG. 6 is a front view of the clamp of the embodiment of FIG. 1.

FIG. 7 is a side view of FIG. 6.

DETAILED DESCRIPTION OF A PREFERRED EMBODIMENT

The present invention provides an accessory tray for a golf bag cart for holding golf balls, golf tees, beverages, towels and the like. The accessory tray of the present invention is durable and lightweight so not to upset the balance of the cart. The tray is easily mounted and removed from the cart. This allows the cart to be transported and/or stored without extensive assembly or disassembly.

A preferred embodiment of the accessory tray of the present invention is illustrated in FIGS. 1-8. The golf bag cart 10 on which the present invention is to be used, typically is of the type illustrated in FIG. 1. This type of cart 10 includes a bag carrying portion 12, two wheels 14, 16, and an upper portion 18 with a handle. This type of cart is easily collapsible when not in use for ease in transporting and storage. The present invention is not meant to be limited for use on this type of cart but includes other variations of golf bag carts and other comparable uses.

Figure 1:
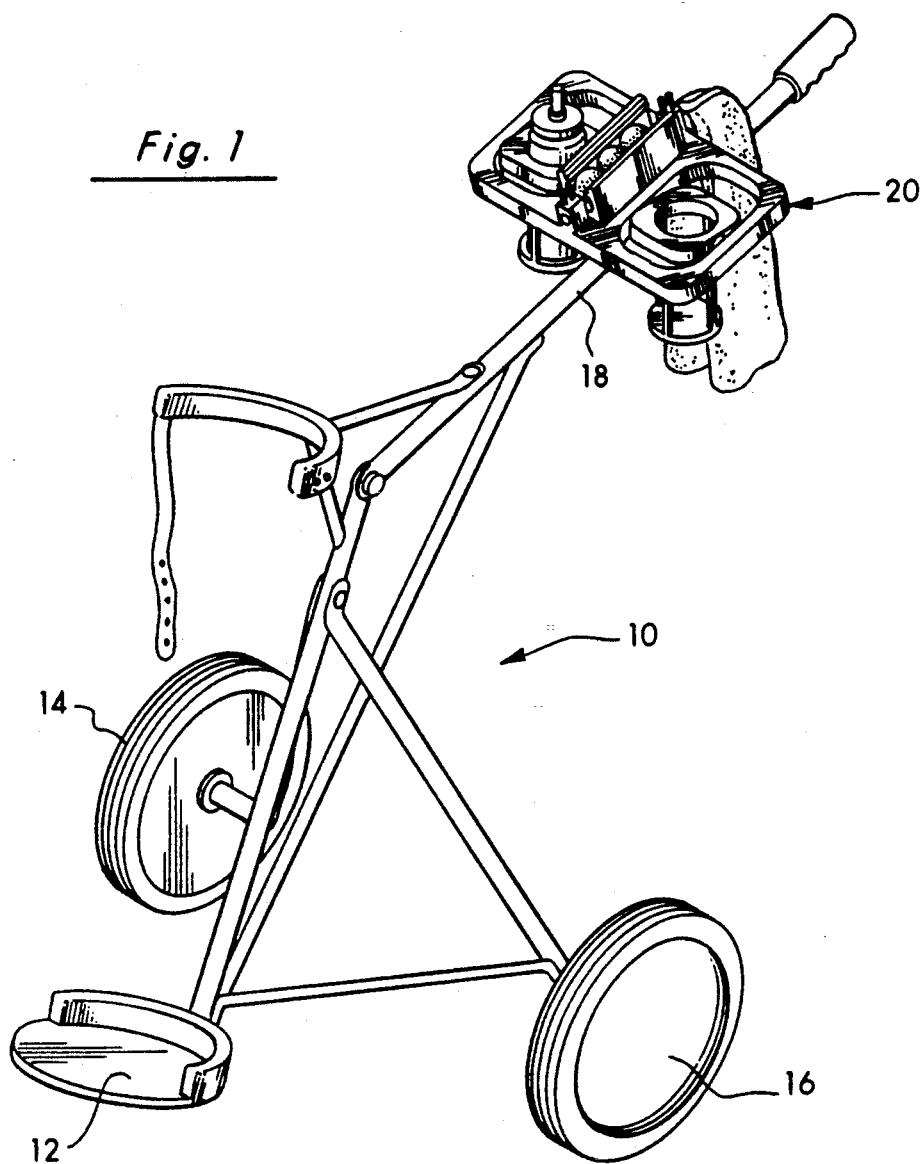
FIG. 1 is a perspective view of a preferred embodiment of the present invention mounted on a golf bag cart.

A preferred embodiment of the accessory tray 20, illustrated in FIG. 1, is mounted on the upper portion 18 of golf cart 10. It is to be expressly understood that this description of a preferred embodiment is for explanatory purposes only, and is not meant to limit the scope of the inventive concept. Other embodiments and variations are considered to be within the limits of the claimed invention.

As shown in FIGS. 2 and 3, tray 20 has a substantially rectangular shape with an upper surface 22, lower surface 24, front surface 26, rear surface 28 and sides 30, 32. Tray 20 is formed from of a one-piece, lightweight, injection-molded plastic. Tray 20 can be provided in various colors as desired, to compliment the golfer's equipment, attire, or popular fashions. Also, logos and designs (not shown) may be applied to the surfaces of tray 20, such as equipment manufacturer's logos, advertisements, names of golf courses, or personalized names. Tray 20 is not meant to be limited to this descriptive embodiment and can be formed in other shapes, sizes, and of materials.

Tray 20 includes two apertures 34, 36 arranged symmetrically on the tray. Apertures 34, 36 are substantially rectangularly-shaped to receive container holders 38, 40 respectively. Container holders, 38, 40 are identical in configuration, therefore only container holder 40 will be described in detail. Container holder 40 includes an upper surface 42 having a circular hole 44 formed therein to receive a container. A plurality of elongated rails 46 extend downward from upper surface 42 spaced from one another to form a diameter approximately equal to the diameter of hole 44. Circular shaped lower surface 48 is formed at the lower end of rails 46. The diameter of hole 44, the spacing of rails 46 and the length of rails 46 is selected to accommodate a desired type of container. For instance, in the preferred embodiment, container holders 38, 40 will hold a thirty-two (32) ounce bottle. Container holders 38, 40 may also include an insulating material, such as neoprene, to maintain the temperature of the containers. Other shapes and sizes of container holders may be used within the scope of the claimed invention.

Figure 5:
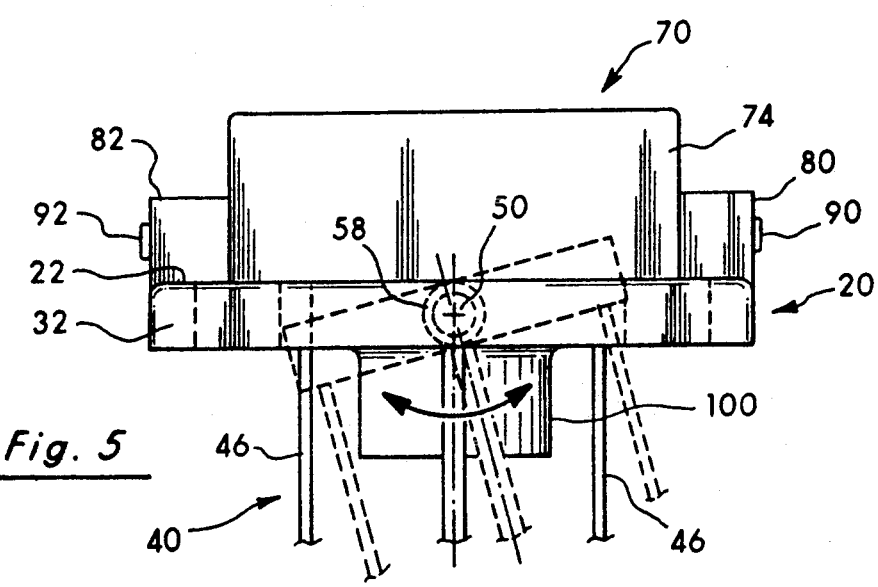
FIG. 5 is a side view of FIG. 3 showing the pivoting action of a container holder.

Cavities 50, 52, illustrated in FIGS. 3 and 4, are formed in opposite sides of aperture 36 as well as cavities 54, 56 in opposite sides of aperture 34. Container holders 38, 40 have radially outwardly-extending projections 58, 60, 62, 64 on diametrically opposed sides of each holder. Projections 58, 60, 62, 64 are adapted to fit within cavities 50, 52, 54, 56 to attach container holders 38, 40 in apertures 34, 36. Tray 20, at the area of apertures 34, 36, and container holders 38, 40 are sufficiently resilient so that container holders 38, 40 are easily mounted on tray 20 by deforming the tray and holders slightly so the structures interfit. Projections 58–64 are shaped to pivot within cavities 50–56 so that container holders 38, 40 will be pivotable relative to tray 20 as illustrated in FIG. 5. This provides a self-leveling feature as discussed below.

Tray 20 also includes a holder 70 for golf balls as shown in FIGS. 2-4. Golf ball holder 70 has two walls 72, 74 extending vertically upward from upper surface 22 of tray 20. Walls 72, 74 are parallel to one another and spaced apart a distance slightly larger than the diameter of a golf ball. Ridges 76, 78 are formed on walls 72, 74, respectively, parallel to the surface of the tray and spaced above the lower end of the walls a distance slightly greater than the diameter of a golf ball. Ridges 76, 78 extend radially inward into the space between walls 72, 74 spaced apart a distance slightly less than the diameter of a golf ball. Ridges 76, 78 are tapered so that a golf ball can be pressed down against the ridges to resiliently move walls 72, 74 to allow the golf ball to fit between walls 72, 74 beneath ridges 76, 78. The golf balls are then held in place from movement outside holder 70 until needed.

End stops 80, 82 are located at each end of the center of the space formed between walls 72, 74 to prevent golf balls held in holder 70 from rolling out of the ends of holder 70. Holes 84 are formed in the upper surface of each of end stops 80, 82 to hold golf tees. The golf tees are inserted in holes 84 until needed.

Snaps 90, 92 are formed on surfaces 26, 28 of tray 20 onto which straps, hooks or the like may be attached to hold towels, caps, and other items.

Bayonet-type mounting portion 100 extends downward from the center of lower surface 24 of tray 20 as shown in FIG. 4. Mounting portion 100 includes a hollow cylindrical portion 102 and upside down "L"-shaped slots 104, 106 on diametrically opposed sides of mounting portion 100. Both slots 104, 106 are formed identically, therefore only slot 104 will be discussed in detail.

Slot 104 includes a first portion 108 extending from the lower end of mounting portion 100 into mounting portion 100 in a direction perpendicular to the lower surface 24 of tray 20. Second portion 110 extends perpendicular to and opens into first portion 108. Neck portion 112 is located in second slot 110 adjacent first slot 108. The area of mounting portion 100 at neck portion 112 is resilient, as described below.

Figure 8:
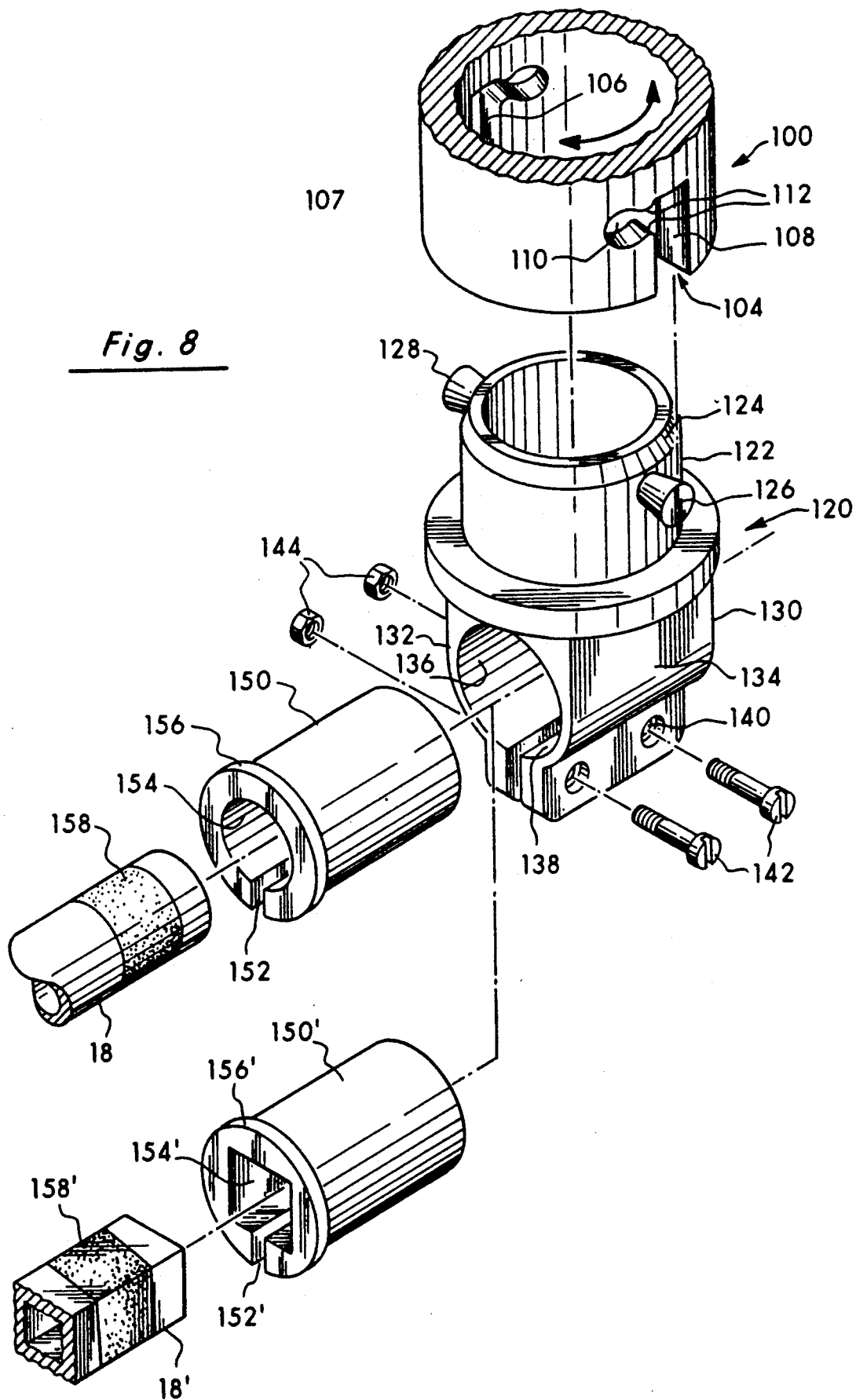
FIG. 8 is an exploded view of the clamp of the embodiment of FIG. 1.

Clamp 120 for mounting tray 20 to golf cart 10 is illustrated in FIGS. 6-8. Clamp 120 includes an upper portion 122 having a cylindrical shape with an external diameter adapted to mate with the internal diameter of cylindrical hole portion 102 of mounting portion 100 of tray 20. Upper portion 122 further includes beveled portion 124 at the upper end to guide tray 20 onto clamp 120. Projections 126, 128 extend radially outward from diametrically opposite sides of upper portion 122 near the upper end. Projections 126, 128 include tapered surfaces extending inward from the outer end of the projections. Projections 126, 128 are adapted to form a bayonet-type mount with slots 104, 106 of tray 20 as described below.

Clamp 120 includes a lower portion 130 as shown in FIGS. 6 and 7 which clamps onto the golf bag cart. Lower portion 130 has two arms 132, 134 extending downward from the center of clamp 120 with arcuate portions 136, 138 formed on the inside of each arm. Arcuate portions 136, 138 form cylindrical clamping surfaces for clamping onto golf bag cart 10. Screw holes 140 are formed near the lower end of each of arms 132, 140 for screws 142 to be inserted therein. Nuts 144 are tightened onto screws 142 as shown in FIG. 8 to secure clamp 120 onto golf cart. Screw holes 142 can include countersinks 146 for the heads of screws 142 and nuts 144 to recess therein.

Rubber bushing 150 is mounted between clamp 120 and upper portion 18 of golf bag cart 10 as illustrated in FIG. 8. Bushing 150 has a longitudinal split 152 in order to deform as necessary to fit a variety of sizes of golf bag carts. As shown in FIG. 8, bushing 150 has a cylindrical hole 154 to fit upper portions 18 having a cylindrical shape while bushing 150' has a square inner hole to fit on to upper portions 18' having a square shape. Both bushings 150, 150' include flanges 156, 156' respectively, to prevent clamp 120 from slipping relative to golf bag cart 10.

Double-backed adhesive tape 158 is applied on the area of upper portion 18 on which clamp 120 is to be mounted. This further adds restraint to prevent slipping of clamp 120 and bushing 150 relative to cart 10.

Method of use

In use, clamp 120 is initially mounted onto golf bag cart 10. The desired location on the upper portion 18 of the cart for clamp 120 is selected first. Then, double-backed adhesive tape 158 is applied at the selected location. This restrains bushing 150 from slipping relative to the cart. The appropriate bushing 150 is mounted over tape 158, either by sliding over the end of the handle of the cart, or by expanding the slit 152 of bushing 150 to place bushing 150 directly over tape 158 on upper portion 18. Clamp 120 is then mounted over bushing 150 in a similar fashion. Also, bushing 150 and clamp 120 could be placed over tape 158 at the same time. Screws 142 are inserted into holes 140 of clamp 120 and nuts 144 are tightened on the screws until the clamp is securely attached to the golf bag cart as shown in FIG. 8. Since upper portion 18 is typically angled downward, flange 156 of the bushing 150 will restrain the clamp 120 and the tray 20 from sliding on the cart. It is important to align the upper portion 122 of the clamp with the golf bag cart so that the tray will not affect the center of balance of the cart.

Tray 20 is then placed onto the upper portion 122 of clamp 120 so that the center hole 102 is guided over upper portion 122 of clamp 120. Beveled edge 124 will assist in this. Slots 106, 108 should be aligned with projections 126, 128. Once projections 126, 128 are fully inserted into slot portions 108, tray 20 is swiveled counterclockwise as indicated by the arrow in FIG. 8. The tapered surfaces of projections 126, 128 will cause the neck portion 112 of the slots 104, 106 to resiliently expand to allow projections 126, 128 to enter into slot 110. Neck portions 112 will then resiliently move back into position to lock the projections in slots 110 to prevent accidental dislodgement of the tray relative to the clamp. To remove the tray from the clamp, the tray is swiveled clockwise and then lifted from the clamp.

Container holders 38, 40 are attached within apertures 34, 36 by slightly deforming the tray and/or the container holders until the projections 58, 60, 62, 64 engage in the cavities 50, 52, 54, 56. The ability of the container holders to pivot within the apertures creates a self-leveling feature so that the containers will stay level even though the tray is angled. The size and shape of the container holders can be chosen to hold a desired type of container. For instance, in the preferred embodiment, a thirty-two ounce bottle is used. Also, neoprene or other insulating materials can be used to maintain the temperature of the container held.

Another embodiment of the tray includes gimbal-mounted container holders (not shown). Typically, in this type of mounting, a ring is mounted to pivot about a first axis relative to the tray and the container holder is mounted within the ring to pivot relative to the ring about an axis perpendicular to the first axis. This allows the container holder to stay level regardless of the angle of the tray.

A supply of golf balls can be kept in the golf ball holder 70 by simply pressing them pass the ridges 76, 78. The walls 72, 74 are sufficiently resilient to allow the walls to move away from each other for the balls to be inserted and removed. The ridges 76, 78 and the end stops 80, 82 prevent the balls from accidently falling off the tray until they are removed.

Golf tees can be inserted in the holes on the end stops 80, 82. The taper on the golf tees is adequate to ensure a friction fit in the holes 84 until the tees are removed.

Snaps 90, 92 are included on the perimeter of the tray so that straps, hooks, etc can be added to hold towels, caps or other items. Additional straps can be included if desired around the perimeter of the tray.

When the cart is to be stored or transported, the tray is simply swiveled clockwise and lifted from the clamp. The clamp can remain on the cart if desired, to quickly mount the tray the next time. Also, the container holders can be easily removed from the tray if necessary.

The present invention provides an accessory tray for golf bag carts affording convenience of use. The above description of a preferred embodiment is not meant to limit the claimed invention, but includes other embodiments and variations within the scope of the inventive concept.

We claim:

1. An accessory tray assembly for golf bag carts, said assembly comprising:
   a clamp adapted for mounting onto the upper portion of a golf bag cart;

a tray, said tray including:
    means for holding one or more containers level regardless of the angle of said tray;
    means for holding one or more golf balls;
    means for holding one or more golf tees; and
    means for removably attaching said tray onto said clamp to enable said tray to be easily assembled and disassembled relative to said golf bag cart.

2. The assembly of claim 1 wherein said attachment means include bayonet mounting means on said clamp and on said tray.

3. The assembly of claim 1 wherein said attachment means includes:
    an upstanding cylindrical portion on the upper portion of said clamp having two outwardly directed radial projections extending diametrically opposite of one another; and
    a tubular portion on said tray extending downward and having an internal diameter greater than the external diameter of said cylindrical portion, said tubular portion includes:
        two diametrically opposed upside-down "L"-shaped slots formed on each side of said tubular portion,
        each of said L-shaped slots having a first portion extending parallel to the longitudinal axis of said tubular portion and a second portion extending perpendicular to said first portion at a predetermined distance from the lower end of said tubular portion and connected to said first portion,
        each of said slot portions having a width slightly larger than the diameter of said projections to form a bayonet-type mounting between said clamp and said tray.

4. The assembly of claim 3 wherein each of said radial projections include an outer surface tapered inward from the end of each of said radial projections; and
    said second slot portions include a resilient neck portion adjacent said first portions narrower than said end of said radial projections so that said tapered surfaces of said radial projections resiliently expand said neck portions to allow insertion of said radial projections to retain said radial projections in said second slot portions.

5. The assembly of claim 1 wherein said container holders includes:
    at least one aperture in said tray; and
    basket means for holding said container resiliently mounted within each of said aperture by resilient detents to enable ease of assembly and disassembly.

6. The assembly of claim 5 wherein said basket means are mounted within said aperture to pivot relative to said tray.

7. The assembly of claim 5 wherein said basket means include insulating material to maintain the temperature of said container.

8. The assembly of claim 1 wherein said golf ball holding means include:
    two upstanding resilient retaining walls extending from the upper surface of said tray spaced parallel to one another a distance approximately equal to the diameter of a golf ball;
    ridges extending along the length of each of said walls opposing one another and spaced a distance from the upper tray surface approximately equal to the diameter of a golf ball to restrain golf balls between said retaining walls; and
    stop means formed at each end of the space between said retaining walls to retain golf balls between said retaining walls.

9. The assembly of claim 8 wherein said golf tee holding means are formed in each of said stop means.

10. The assembly of claim 1 wherein said tray includes snap means on the perimeter of said tray for securing items to said tray.

11. The assembly of claim 1 wherein said clamp includes a resilient hollow bushing having an outer surface conforming to the shape of the clamping surface of said clamp and an inner surface conforming to the shape of the surface onto which said clamp is to be mounted.

12. The assembly of claim 1 wherein said assembly further comprises double-backed adhesive tape to restrain said clamp from slipping relative to said golf bag cart.

13. An accessory tray assembly for golf bag carts, said assembly comprising:
    a clamp adapted for mounting onto the upper portion of a golf bag cart;
        an upstanding cylindrical portion on the upper portion of said clamp having two outwardly directed radial projections extending diametrically opposite of one another; a tray, said tray including:
    means for holding one or more containers level regardless of the angle of said tray;
    means for holding one or more golf balls;
    means for holding one or more golf tees;
    and
    a tubular portion on said tray extending downward and having an internal diameter greater than the external diameter of said cylindrical portion, said tubular portion including:
        two diametrically opposed upside-down "L"-shaped slots formed on each side of said tubular portion,
        each of said L-shaped slots having a first portion extending parallel to the longitudinal axis of said tubular portion and a second portion extending perpendicular to said first portion at a predetermined distance from the lower end of said tubular portion and connected to said first portion,
        each of said slot portions having a width slightly larger than the diameter of said projections to form a bayonet-type mounting between said clamp and said tray.

14. The assembly of claim 13 wherein said container holders includes:
    at least one aperture in said tray; and
    basket means for holding said container resiliently mounted within each of said apertures by resilient detents to pivot relative to said tray to reduce the possibility of spillage and to enable ease of assembly and disassembly.

15. The assembly of claim 14 wherein said basket means include insulating material to maintain the temperature of said container.

16. The assembly of claim 13 wherein said golf ball holding means include:
    two upstanding resilient retaining walls extending from the upper surface of said tray spaced parallel to one another a distance approximately equal to the diameter of a golf ball;
    ridges extending along the length of each of said walls opposing one another and spaced a distance from the upper tray surface approximately equal to the diameter of a golf ball to restrain golf balls between said retaining walls; and stop means formed at each end of the space between said retaining walls to retain golf balls between said retaining walls.

17. The assembly of claim 13 wherein said golf tee holding means are formed in each of said stop means.

18. The assembly of claim 13 wherein said tray includes snap means on the perimeter of said tray for securing items to said tray.

19. The assembly of claim 13 wherein said clamp includes a resilient hollow bushing having an outer surface conforming to the shape of the clamping surface of said clamp and an inner surface conforming to the shape of the surface onto which said clamp is to be mounted.

20. A method of carrying accessories on a golf bag cart by using an accessory tray assembly having two container holders, a golf ball holder and golf tee holders, said method comprising the steps of:

applying a double-sided adhesive tape onto a predetermined location on the upper portion of a golf bag cart;

mounting a resilient bushing corresponding to the shape of said golf bag cart onto said adhesive tape;

mounting a clamp having a bayonet-type mounting portion on the upper surface of the clamp onto said bushing;

securing said clamp onto said bushing to mount said clamp onto said cart;

placing an accessory tray having a lower bayonet-type mounting portion adapted to mate with said clamp bayonet-type mounting portion onto said clamp bayonet-type mounting portion;

swiveling said tray relative to said clamp to securely attach said tray onto said clamp and said cart.

21. The method of claim 20 wherein said method further comprises the step of:

mounting at least one container holder in apertures of said tray by resilient detents for pivotal movement relative to said tray.

22. The method of claim 20 wherein said method further comprises the steps of:

placing at least one golf ball between resilient side walls of said golf ball holder to hold said at least one golf ball.

23. The method of claim 22 wherein said method further comprises the step of:

placing at least one golf tee in end stop portions formed at the ends of said golf ball holder.

24. The method of claim 20 wherein said method further comprises the step of:

mounting a strap or hook onto snaps formed on the perimeter of said tray to hold towels, hats or other items.

25. The method of claim 20 wherein said method further comprises the steps of:

reversing the direction of swiveling the tray relative to said tray; and removing said tray from said clamp for storage or transport.

* * * * *